July 21, 1942.  C. M. WEINHOLD  2,290,841
CORN SHELLER SHAFT GUARD
Filed Oct. 9, 1939
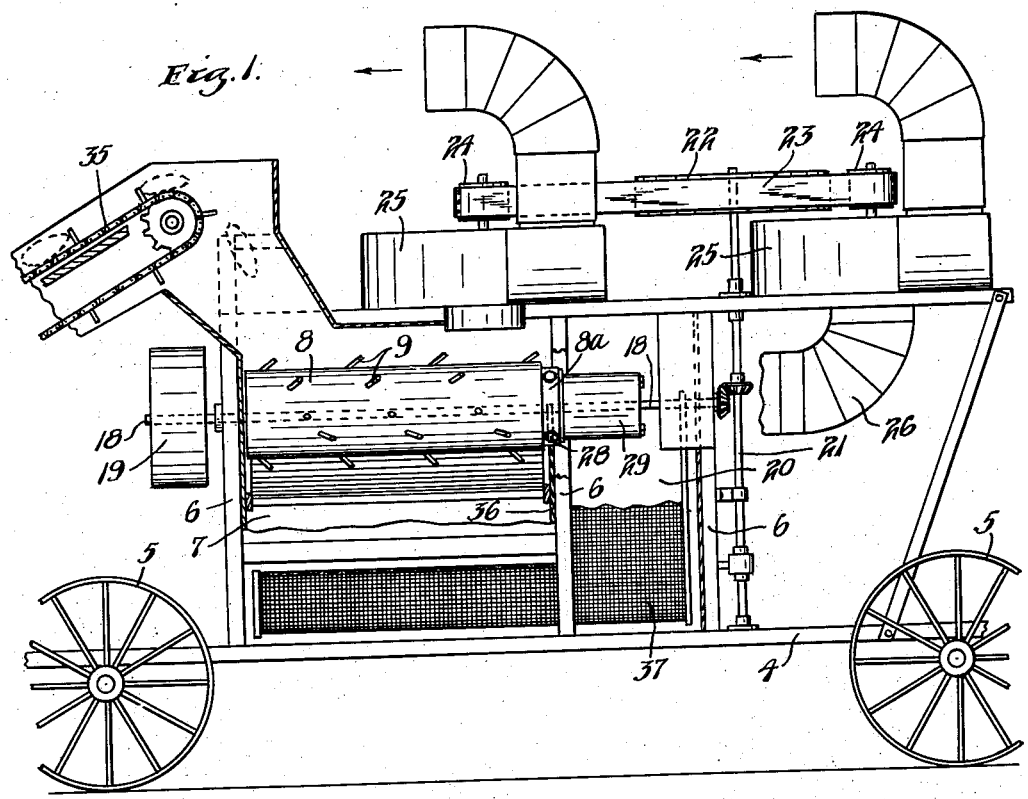
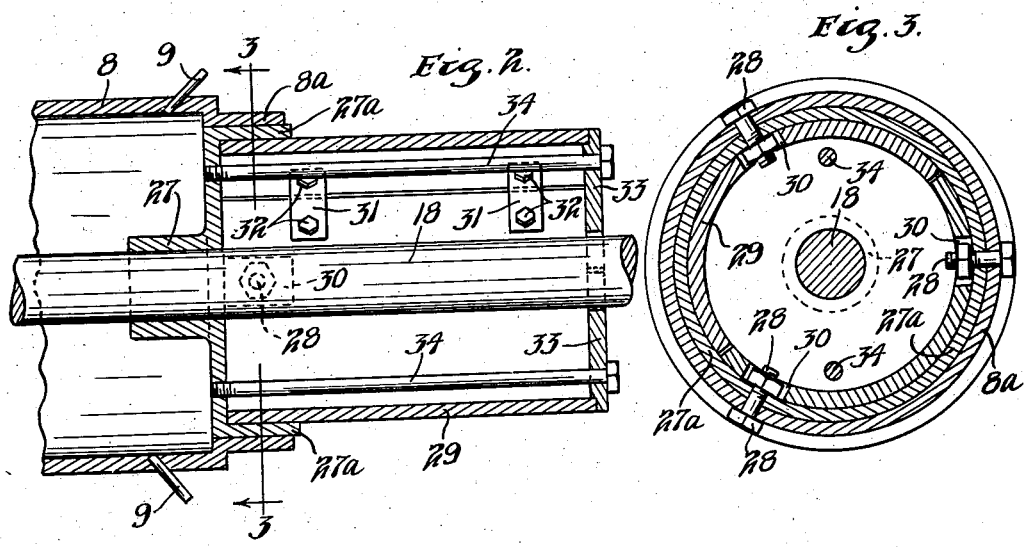
INVENTOR.
CLARENCE M. WEINHOLD.
BY HIS ATTORNEYS.
Williamson & Williamson Patented July 21, 1942

2,290,841

UNITED STATES PATENT OFFICE 2,290,841

CORN SHELLER SHAFT GUARD

Clarence M. Weinhold, Cottonwood, Minn.

Application October 9, 1939, Serial No. 298,596

1 Claim. (Cl. 130—6)

This machine relates to harvesting machines and is particularly adaptable to corn shellers wherein the kernels are removed from the cobs and conducted to a storage bin or a vehicle and wherein the cobs and husks are ejected in such a manner that the husks are separated from the cobs.

In certain types of corn shellers drive shafts are provided which carry the shelling cylinder and extend through a husk and cob outlet chamber to drive other mechanism such as husk removing blowers and various conveyers. The extension of the main drive shaft through the chamber in which the husks and cobs are disposed after leaving the shelling concave is a conventional type of structure which has been in use for many years. It has a serious drawback, however, due to the fact that the husks upon leaving the shelling concave fall upon the rotating power shaft and wrap around said shaft. After a short while a large mass of entwined husks forms upon the shaft causing obstruction to the normal outflow of husks and cobs and placing a drag upon the operation of the machine to such an extent that the mass of entwined husks frequently becomes heated to such a degree that it will begin to smoke and will ignite unless the machine is shut down and the husks cut away from the shaft. This is not only hard on the apparatus itself, but causes unnecessary delays and increases the cost of the corn shelling operation.

It is, therefore, a general object of my invention to provide a structure for use in combination with the drive shaft or other rotating shaft of a harvesting machine such as a corn sheller where the shaft is placed in the path of travel of husks and similar materials which will prevent said husks from entwining about the shaft and bringing about the undesirable condition set forth above.

Another object of the invention is to provide a husk guard which can be attached to a previously constructed machine without dismantling any of the assembled structure thereof.

Another object of the invention is to provide a relatively simple construction which can be quickly and easily applied without requiring the services of an expert mechanic.

These and other objects and advantages of the invention will more fully appear from the following description made in connection with the accompanying drawing, wherein like reference characters refer to the same parts throughout the views, and, in which:

Fig. 1 is a side elevation of a corn sheller with certain parts broken away to show some of the essential interior elements;

Fig. 2 is an enlarged section through an embodiment of my invention showing a portion of one end of the shelling cylinder; and Fig. 3 is a section taken approximately on the line 3—3 of Fig. 2.

In Fig. 1 there is shown the general arrangement of a corn sheller including a chassis frame 4 mounted upon wheels 5 and having a pair of uprights 6 on either side to support a concave 7 which is of U-shape and has mounted therein a shelling cylinder 8 with teeth 9 mounted thereon. The concave is broken away but since it is a conventional type of structure well known in the art it is not shown in detail.

A longitudinal shaft 18 has its forward end extending from the concave and provided with a drive pulley 19. The shaft carries the shelling cylinder 8 for rotation therewith and extends rearwardly of said cylinder through a husk and cob receiving compartment 20 to connect by means of suitable gearing with a vertical shaft 21. The shaft 21 carries a large pulley 22 which is connected by means of a belt 23 to smaller pulleys 24 which drive blowers 25. These blowers are for removing dust and husks from the shelling chamber or concave as well as from the husk and cob receiving chamber 20. The pipe 26 leads from the cob receiving chamber 20 to the right-hand blower 25, but it is broken away since it is not an element of the present invention.

Referring more particularly to Fig. 2 the main drive shaft 18 has a hub 27 secured thereto and this hub connects with the right-hand or rear end of the shelling cylinder 8. The cylinder has a flange 8a which fits over a flange 27a on the hub 27 and is secured thereto by nutted bolts 28. Fitting over a portion of the shaft 18 is a split sleeve 29 which is cylindrical in shape and whose left-hand end is provided with a plurality of cut-outs 30 so that the sleeve can be slipped into the hub 27 within the flange 27a and the cut-outs 30 will receive the nuts on the bolts 28. The halves of the sleeve 29 are secured by strips 31 which have bolts 32 extending through the strips and into the respective halves of said sleeve. The sleeve is divided for placement over the shaft 18 and the connecting strips 31 are secured to hold the sleeve together. The right-hand end of the sleeve is capped by a pair of generally semi-circular end plates 33 which are cut away to receive the shaft 18, and these end plates are held in position by rods 34 which extend through said plates through the sleeve 29 and are threadedly secured in the sheller cylinder hub 27. The sleeve-like husk guard 29 is then held in position concentric to the shaft 18 and for rotation with said shaft and the cylinder hub 27.

Ears of corn with the husks thereon are fed into the shelling chamber by means of a suitable conveyer 35 and rotation of the cylinder 8 in the shelling chamber or concave removes the kernels from the cobs. The kernels are taken from the machine by means of any suitable conveyer not shown, and the cobs and those of the husks which are not removed by the left-hand suction blower 25 are fed over a baffle or gate 36 and then fall into the husk and cob receiving chamber 20. The cobs fall upon a slanting screen 37 and drop from the machine. The screen is provided to permit kernels to fall therethrough which might have been fed over the baffle or gate 36 with the husks and cobs. It will be seen that the drive shaft 18 is located adjacent the top of the baffle or gate 36 and as the husks are fed over said baffle many of them ordinarily wind about the shaft 18 producing the entwined mass mentioned above. This condition is particularly pronounced when the husks are damp. The diameter of the shaft 18 is such that the husks can wrap around the same several times and it is impractical to construct a drive shaft of sufficient diameter to prevent the husks from wrapping. My improved husk guard, however, provides a device of such diameter that the husks are not long enough to wrap around it, and it is placed in the cob and husk receiving chamber 20 in such position that the shaft 18 is fully protected from those husks which are discharged over the baffle 36. As illustrated in Fig. 1 the husk guard 29 need not necessarily extend entirely across the husk receiving chamber on the rod 18, but it is, of course, understood that the cylindrical guard 29 is to be made of sufficient length to provide the shaft protection desired. It is contemplated that the husk guard can be attached directly to the shaft 18 through some suitable attachment means since it is the primary object of my invention to provide a husk guard which will encounter and deflect husks from the shaft 18. It is particularly desirable, however, that the left-hand or forward end of the husk guard be placed in close proximity to the end of the shelling cylinder 8 so that husks cannot fall down between the end of the cylinder and the guard itself and wind around the drive shaft 18.

From the foregoing description it will be seen that I have provided a relatively simple yet extremely effective device for preventing husks from entwining around power shafts which extend through areas in the path of flow of the husks to prevent the same from entwining around the shaft, thus eliminating shut downs to permit removal of the entwined husks. Frequently the shut down is not a momentary affair, but one which consumes considerable time with the aid of a sharp knife to remove these husks and where the machine or crowd are hired on a time basis, the elimination of shut downs is quite a considerable factor in the ultimate cost of the harvest.

It will, of course, be understood that various changes may be made in the form, details, arrangement and proportions of the various parts without departing from the scope of my invention.

What is claimed is:

In a corn sheller having a concave, a cylinder having a flanged hub, a shaft extending through said concave and supporting said cylinder and its hub thereon, a cob and husk receiving chamber communicating with said concave at one side thereof, and said shaft extending through said receiving chamber; a longitudinally divided cylindrical husk guard lying about said shaft in said receiving chamber, one end of said husk guard abutting said cylinder and lying substantially in contact with and concentric to said flanged hub to prevent husks from working in between said hub and that portion of said guard concentric thereto, said guard being of considerably greater diameter than said shaft and having its outer end terminating a substantial distance from the opposite side of said receiving chamber from said cylinder, means for detachably connecting the sections of said longitudinally divided husk guard, a divided end plate having an aperture therethrough of a size approximating the diameter of said shaft and substantially closing that end of said guard remote from said cylinder, and a pair of rod-like members, one of each extending through a division of said end plate and lengthwise through said guard to the opposite end of said guard and being detachably secured to the hub of said cylinder.

CLARENCE M. WEINHOLD.